2,762,832
Patented Sept. 11, 1956

2,762,832

N-TRICYANOVINYLAMINES AND A PROCESS FOR PREPARING THEM

Richard Edwin Heckert, Wilmington, Del., assignor to E. I. du Pont de Nemours and Company, Wilmington, Del., a corporation of Delaware No Drawing. Application September 28, 1953, Serial No. 382,859

9 Claims. (Cl. 260—465)

This invention relates to nitrogen compounds and, more particularly, to certain percyanoalkenyl compounds.

An object of the present invention is to provide a new class of useful compounds and a process of preparing same. A further object is to provide a new class of percyanoalkenyl compounds useful as a source of hydrogen cyanide and, hence, as insecticides. A still further object is to provide a new class of compounds useful as dyes, particularly for dyeing "Orlon" acrylic fiber and "Dacron" polyester fiber. Other objects will be apparent from the description of the invention given hereinafter.

The above objects are accomplished according to the present invention by reacting tetracyanoethylene with ammonium ion or select amines as characterized below to form N-tricyanovinylamines.

Tetracyanoethylene, $(CN)_2C=C(CN)_2$, can be prepared by the reaction of sulfur monochloride with malononitrile, conveniently in the presence of an inert liquid diluent, and thereafter separating the tetracyanoethylene formed from the reaction mixture. This is disclosed and claimed in application Serial No. 382,842, filed of even date herewith jointly in the names of T. L. Cairns and E. A. Graef.

It has now been found that tetracyanoethylene will readily react under mild conditions with ammonium ion and certain amines to give highly useful N-tricyanovinylamines which are characterized by the grouping

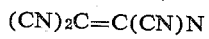

These compounds conform to the following formula:

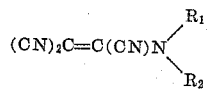

in which $R_1$ and $R_2$, when taken singly, are hydrogen, alkyl, cycloalkyl, aralkyl, and aryl including substituted aryl; and when taken together, are a divalent organic radical.

The N-tricyanovinylamines of the present invention are prepared by reacting tetracyanoethylene with ammonium ion or any one of the following classes of amines:

1. Primary and secondary aliphatic and cycloaliphatic amines and aralkylamines.

2. Primary aromatic amines in which at least one ring carbon immediately adjacent to the carbon attached to the amino group is directly attached to hydrogen or halogen.

3. Primary aromatic amines having no hydrogen directly attached to ring carbons in the 2-, 4-, and 6-positions, considering the carbon attached to the amino group as being in the 1-position.

4. Secondary aromatic amines having no hydrogen attached to the ring carbon in the 4-position.

5. Heterocyclic secondary amines in which the ring is resonance stabilized and contains no ring carbon directly attached to hydrogen and in which only two bonds of the nitrogen are attached to the ring.

Resonance in organic molecules and its effect on their stability is discussed in detail in G. W. Wheland's book "The Theory of Resonance," John Wiley and Sons, New York, 1944.

When an N-tricyanovinylamine is obtained by reaction of tetracyanoethylene with ammonium ion or one of the herein considered amines in which hydrogen is directly attached to the amino nitrogen, the reaction takes place by a unique condensation in which the elements of hydrogen cyanide are lost.

In the reaction of tetracyanoethylene with ammonium ion and amines, the above classes consisting of ammonium ion and select amines have been found limiting for the preparation of N-tricyanovinylamines as the predominant products, since the structure of the amine determines whether the tricyanovinyl group is directed toward attachment to the amino nitrogen or toward attachment to one of the carbon atoms of the amine. In applicant's application Serial No. 382,860, filed of even date herewith and entitled "Preparation of Organic Compounds," the classes of amines which react with tetracyanoethylene to give C-tricyanovinyl derivatives as the predominant products are shown. The dividing line is distinct but not absolute, as will be seen in the following examples in which certain amines from the above classes which react with tetracyanoethylene to give preponderantly the expected N-tricyanovinyl derivatives, at the same time yield minor proportions of C-tricyanovinyl derivatives.

The reaction of this invention can be carried out under mild conditions, generally at room temperature (about 25° C.) and at atmospheric pressure. It is convenient to carry out the reaction in the presence of an organic liquid inert to the reactants and capable of dissolving tetracyanoethylene. The use of such a solvent facilitates bringing the reactants together and controlling the temperature of reaction. Relatively low boiling organic solvents such as tetrahydrofuran, benzene, alcohol, and acetone, in which tetracyanoethylene is readily soluble, may be used as well as such solvents as chloroform and diethyl ether in which tetracyanoethylene is only sparingly soluble. However, the presence of a solvent is a convenience and is not fundamental to the chemistry of the reaction. For example, when the amine is a liquid at room temperature, such as aniline, tetracyanoethylene may be dissolved directly therein. The mixture is stirred, and the heat of reaction is removed by appropriate cooling. Solid N-tricyanovinyl aniline separates from the mixture.

In a preferred embodiment of this invention, an amine such as butylamine or aniline is added slowly with agitation to a solution of tetracyanoethylene in tetrahydrofuran at room temperature. The reaction to form the N-tricyanovinyl derivative of the amine proceeds smoothly. When the reaction is complete, the tetrahydrofuran solvent is removed under reduced pressure and the crude N-tricyanovinyl derivative is purified by washing and recrystallization from a suitable organic solvent.

The following examples, in which all proportions are by weight unless otherwise stated, illustrate the preparation of specific N-tricyanovinylamines according to the present invention.

Example I

To a stirred solution of 50 parts of tetracyanoethylene in 666 parts of tetrahydrofuran was added dropwise 28.5 parts of n-butylamine. The solution was stirred at room temperature for three hours and then refluxed for fifteen minutes. The tetrahydrofuran was removed under reduced pressure at 40° C. The residue, a black liquid, crystallized on storage at 6° C. overnight. The crude product, washed by suspension in petroleum ether and air dried, weighed 56 parts (88%). Several recrystallizations from petroleum ether, B. P. 35–60° C./diethyl ether gave colorless crystals, M. P. 58° C., of N-tricyanovinyl-n-butylamine.

*Analysis.*—Calcd. for C₉H₁₀N₄: C, 62.0; H, 5.78; N, 32.2. Found: C, 62.06, 62.14; H, 5.82, 5.91; N, 32.17, 32.50.

Maximum absorption in the ultraviolet occurred at 325 mμ, and the molecular extinction $\epsilon_{325\ m\mu}$ was 12,700. All absorption and molecular extinction data shown herein were measured on a Cary recording spectrophotometer built by the Applied Physics Corporation of Pasadena, California. The terms used are explained by Brode, W. R., "Chemical Spectroscopy," John Wiley and Sons, New York, 1939, page 4. The analytical data are consistent with the formula:

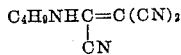

Example II

To a solution of 50 parts of tetracyanoethylene in 666 parts of tetrahydrofuran was added 105 parts of stearylamine. The reaction mixture was stirred and refluxed three hours. The solvent was removed under reduced pressure at 40° C., leaving 130 parts of crude N-tricyanovinyl-n-stearylamine. A colorless sample for analysis was prepared by two recrystallizations from aqueous acetic acid (Darco) and was dried at 56° C. in vacuo, M. P. 83° C.

*Analysis.*—Calcd. for C₂₃H₂₈N₄: C, 74.6; H, 10.35; N, 15.1. Found: C, 73.84, 73.58; H, 9.93, 9.99; N, 15.00, 15.04. UV: $\epsilon_{326\ m\mu}$=12,500.

The analytical data are in accord with the formula:

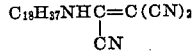

Example III

To a solution of 50 parts of tetracyanoethylene in 888 parts of tetrahydrofuran was added 42 parts of benzylamine in 444 parts of tetrahydrofuran. Addition was carried out over twenty minutes. The mixture was stirred at room temperature for two hours and the solvent was removed under reduced pressure at 40–50° C. There remained 78 parts (96%, crude) of brown crystalline N-tricyanovinylbenzylamine. A sample recrystallized from chloroform/carbon tetrachloride (Darco) was colorless and melted at 121–2° C. (slight dec.).

*Analysis.*—Calcd. for C₁₂H₈N₄: C, 69.2; H, 3.87; N, 26.9. Found: C, 69.28, 69.09; H, 3.84, 3.97; N, 26.78, 26.76. UV: $\epsilon_{327\ m\mu}$=14,050.

The analyses agree with the formula:

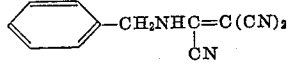

Example IV

To a solution of 50 parts of tetracyanoethylene in 355 parts of tetrahydrofuran was added dropwise 41 parts of cyclohexylamine. The mixture was refluxed for fifteen minutes, cooled, and the tetrahydrofuran was removed under reduced pressure. The residue was recrystallized from chloroform/carbon tetrachloride (Darco) to give 40 parts (51%) of N-tricyanovinylcyclohexylamine in the form of tan crystals. A sample recrystallized twice from chloroform/carbon tetrachloride was colorless and melted at 147–147.5° C. (slight dec.).

*Analysis.*—Calcd. for C₁₁H₁₂N₄: C, 65.9; H, 6.04; N, 28.0. Found: C, 66.22, 65.95; H, 6.32, 6.00; N, 28.10, 28.40. UV: $\epsilon_{325\ m\mu}$=13,600.

The analytical data are in accord with the formula:

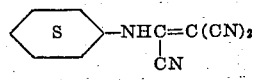

Example V

A solution of 50 parts of tetracyanoethylene in 266 parts of pure, dry tetrahydrofuran was prepared, and 37 parts of aniline was added dropwise. The mixture stood overnight. The tetrahydrofuran was evaporated and the residue was washed by suspension with 1430 parts of cold absolute ether and collected on a filter. The dry, yellow solid weighed 55 parts (73%). The yellow powder was very soluble in methanol and ethanol, sparingly soluble in ether, and insoluble in petroleum ether. Benzene was a satisfactory solvent for recrystallization (required about 3520 parts). Bright yellow crystals of N-tricyanovinylaniline (weight 45 parts; 59%) were obtained. A sample for analysis was dried at 80° C. in vacuo for one hour.

*Analysis.*—Calcd. for C₁₁H₆N₄: C, 68.00; H, 3.1; N, 28.9; M. W., 194. Found: C, 68.21, 68.29; H, 3.16, 3.23; N, 28.52, 28.54; M. W. 197, 198.

The ultraviolet and infrared curves were similar to the spectra of the product from Example XIII, N-tricyanovinylpiperidine, as would be expected, and superimposed on the spectrum of the Example V compound was the spectrum characteristic of an aromatic compound. A specific absorption of 75.6 at 345 millimicrons was observed, corresponding to a molecular extinction coefficient of 14,700. Although the peak absorption at 345 millimicrons is slightly below visible, the compound is yellow and dyed acetate skeins bright yellow.

The data are in accord with the formula:

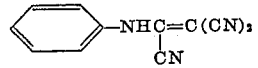

Example VI p-Toluidine, 45 parts, was added slowly to 50 parts of tetracyanoethylene in 266 parts of tetrahydrofuran. The mixture was stirred and refluxed for two hours, and the solvent was removed under a jet of air on the steam table. The residue, recrystallized twice from aqueous acetic acid, gave 40 parts (49%) of bright yellow plates of N-tricyanovinyl-p-toluidine, M. P. 174° C. (dec.).

*Analysis.*—Calcd. for C₁₂H₈N₄: C, 69.20; H, 3.9; N, 26.9. Found: C, 69.27, 69.32; H, 4.16, 3.84; N, 26.88, 27.04. UV: $\epsilon_{350\ m\mu}$=13,500.

The analytical data are in agreement with the formula:

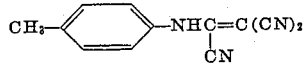

Example VII

To 20 parts of tetracyanoethylene dissolved in 178 parts of tetrahydrofuran was added slowly 20 parts of p-chloroaniline. The mixture was stirred and refluxed three hours, and the solvent was stripped under reduced pressure. The residue, recrystallized from 80% aqueous ethanol (Darco), gave 30 parts (83%) of yellow crystals of N-tricyanovinyl-p-chloroaniline, M. P. 160° C. (dec.).

*Analysis.*—Calcd. for C₁₁H₅N₄Cl: C, 57.8; H, 2.2; N, 24.5. Found: C, 57.76, 57.80; H, 2.10, 2.31; N, 24.21, 24.32. UV: $\epsilon_{346\ m\mu}$=14,900.

The compound has been assigned the structure:

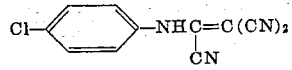

Example VIII

To 50 parts of tetracyanoethylene in 266 parts of tetrahydrofuran was added slowly 59 parts of methyl p-aminobenzoate. The solution was stirred and refluxed for four hours, and the solvent was removed under reduced pressure. The residue weighed 107 parts (100%). A sample recrystallized twice from ethanol and dried at 56° C. in vacuo was yellow and melted at 180° C. (dec.). It was methyl N-tricyanovinyl-p-aminobenzoate.

*Analysis.*—Calcd. for C₁₃H₈N₄O₂: C, 61.9; H, 3.2; N, 22.2. Found: C, 61.95, 61.67; H, 3.45, 3.51; N, 22.56, 22.48. UV: ε360mμ=17,200.

The analytical data are in accord with the formula:

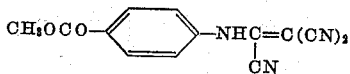

Example IX

To 50 parts of tetracyanoethylene in 266 parts of tetrahydrofuran was added slowly 60 parts of p-aminobenzoic acid. The mixture was stirred and refluxed for thirty minutes. Yellow crystals separated. Additional tetrahydrofuran (90 parts) was added, and the mixture was refluxed one hour. The solvent was removed under a jet of air on the steam table. The residue after recrystallization twice from aqueous acetic acid gave 40 parts (43%) of light yellow crystals, M. P. 249–50° C. (dec.).

Analysis.—Calcd. for $C_{12}H_6O_2N_4$: N, 23.5. Found: N, 21.38, 21.54. UV: ε356mμ=15,800.

The product, soluble in 5% sodium bicarbonate solution, appears to be predominantly N-tricyanovinyl-p-aminobenzoic acid:

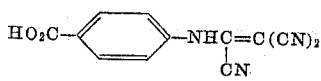

Example X

To 50 parts of tetracyanoethylene in 266 parts of tetrahydrofuran was added 54 parts of m-nitroaniline. The mixture was refluxed for six hours, and the solvent was removed. There remained 95 parts of orange-brown solid. Two recrystallizations from aqueous methanol (50%) gave 52 parts (55%) of yellow crystals, M. P. 171° C. (dec.).

Analysis.—Calcd. for $C_{11}H_5N_5O_2$: C, 55.2; H, 2.11; N, 29.3. Found: C, 55.42; H, 2.26; N, 28.95, 28.99. UV: ε345mμ=15,900.

The analytical data are in agreement with N-tricyanovinyl-m-nitroaniline:

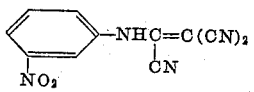

Examples XI

Tetracyanoethylene, 50 parts, and p-nitroaniline, 54 parts, were refluxed in 266 parts of tetrahydrofuran for six hours. The solvent was boiled off, finally at 100° C., and the residue (105 parts) was crystallized from aqueous acetic acid. Several recrystallizations from 50% ethanol provided a pale yellow sample for analysis; M. P., 170° C. (dec.).

Analysis.—Calcd. for $C_{11}H_5N_5O_2$: C, 55.2; H, 2.11. Found: C, 55.47, 55.33; H, 2.08, 2.21. UV: ε332mμ=15,500.

The analyses are consistent with N-tricyanovinyl-p-nitroaniline:

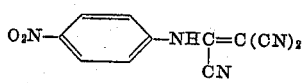

Example XII

To 50 parts of tetracyanoethylene dissolved in 445 parts of tetrahydrofuran was added 57 parts of alpha-naphthylamine in 445 parts of tetrahydrofuran. The solution was stirred at room temperature for 24 hours, and the solvent was removed under reduced pressure. The residue, after being collected on a filter and washed with ether, weighed 65 parts. Two recrystallizations from aqueous acetic acid gave bright yellow crystals of N-tricyanovinylalpha-naphthylamine, M. P. 179° C. (dec.).

Analysis.—Calcd. for $C_{15}H_8N_4$: C, 73.7; H, 3.30; N, 23.0. Found: C, 73.63, 73.88; H, 3.40, 3.60; N, 23.41, 23.43. UV: ε330mμ=10,600. The absorption curve was unusually broad and flat. The structure assigned was

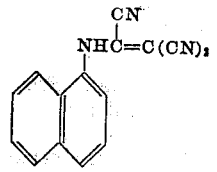

Example XIII

A solution of 20 parts of tetracyanoethylene in 133 parts of tetrahydrofuran was treated with 13.3 parts of piperidine. There was an exothermic reaction after which the reaction mixture was heated gently on the steam table until most of the tetrahydrofuran had been boiled off. There remained in the flask a small amount of black tar-like material which, after standing two days, was observed to contain a crystalline component. The black mixture was leached repeatedly with 360 part portions of diethyl ether, the extracts were filtered, concentrated, and cooled to give a total of 10.9 parts of yellow solid, M. P. 86–87° C. A sample recrystallized from benzene-petroleum ether (35–65° C.) melted at 86–87° C.

Analysis.—Calcd. for $C_{10}H_{10}N_4$: C, 64.5; H, 5.42; N, 30.1. Found: C, 64.40, 64.59; H, 5.42, 5.42; N, 29.50, 29.64.

Infrared showed strong 6.3 micron absorption (conjugate olefin unsaturation) and a 4.55 micron band for the nitrile. No N–H bond absorption was indicated. Peak absorption near the visible occurred at 334 millimicrons, with a molecular extinction coefficient of 15,400. The compound is thought to be N-tricyanovinylpiperidine:

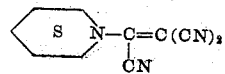

Example XIV

Tetracyanoethylene, 50 parts, and N-methyl-p-toluidine, 47 parts, in 220 parts of tetrahydrofuran was stirred and refluxed for one hour. When the reaction mixture was cooled, light yellow crystals separated. After being collected on the filter and washed with ether, the crystals weighed 70 parts (80%) and melted at 174–6° C. In contrast to the N-tricyanovinyl derivates of primary amines, melting was accomplished without detectable decomposition. The material crystallized on cooling and remelted at 174–6° C. Evaporation of the mother liquors gave an additional 12 parts (94% in all) of product. A sample for analysis was recrystallized twice from absolute alcohol. The crystals were pale yellow in color.

Analysis.—Calcd. for $C_{13}H_{10}N_4$: C, 70.2; H, 4.54; N, 25.2. Found: C, 70.14, 70.25; H, 4.63, 4.64; N, 25.12, 25.02. UV: ε335 mμ=11,900.

The analytical data are in accord with N-methyl-N-tricyanovinyl-p-toluidine:

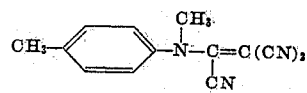

Example XV

To 50 parts of tetracyanoethylene and 266 parts of tetrahydrofuran was added 50 parts of o-toluidine dropwise. The solution was refluxed three hours, and the solvent was removed under reduced pressure. The residue when recrystallized from aqueous acetic acid gave 20 parts of red-brown crystals, M. P. 129–130° C. The color suggested that both C- and N-alkylation might have occurred.

Analysis.—Calcd. for $C_{12}H_8N_4$: C, 69.20; H, 3.9; N, 26.9. Found: C, 69.27, 69.22; H, 4.23, 4.02; N, 27.03.

Two absorption maxima were observed in and near the visible.

$$\epsilon_{330}\ m\mu = 11{,}900$$
$$\epsilon_{497}\ m\mu = 1{,}800$$

These data indicate that the product is a mixture of the C- and N-alkylated derivatives. From the observed extinctions it may be estimated that the product is a mixture of 93% N-alkylated o-toluidine, i. e., N-tricyanovinyl-o-toluidine, and 7% p-C-alkylated o-toluidine.

Example XVI

To 150 parts of tetracyanoethylene dissolved in 660 parts of tetrahydrofuran was added 50 parts of p-phenylenediamine. The mixture was stirred and refluxed for three hours, and the tetrahydrofuran was removed under reduced pressure. The residue, 130 parts of yellow solid, when recrystallized from acetone gave 111 parts (78%) of yellow crystals, M. P. >300° C. (dec.). A sample recrystallized twice from acetone was analyzed.

*Analysis.*—Calcd. for $C_{16}H_6N_8$: C, 61.9; H, 1.95; N, 36.2. Found: C, 62.10, 62.08; H, 2.13, 1.89; N, 36.38, 36.24. UV: $\epsilon_{375}\ m\mu = 22{,}300$.

These data are in accord with N,N'-bistricyanovinyl-p-phenylenediamine:

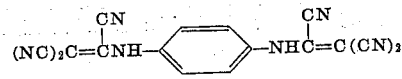

A solution of 50 parts of tetracyanoethylene in 266 parts of tetrahydrofuran was cooled to 0° C. Ammonium acetate, 32 parts, was added slowly. The mixture was stirred at 0° C. for 30 minutes and then allowed to warm to room temperature. Solvent and acetic acid were removed under reduced pressure at room temperature. The residue was pulverized and dried at room temperature in vacuo.

*Analysis.*—Calcd. for $C_5H_2N_4$: N, 47.4. Found: N, 44.14, 44.15.

Strong absorption which occurred in the ultraviolet at 320 m$\mu$ is presumed due to tricyanovinylamine:

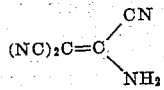

It will be understood that the above examples are merely illustrative and that the invention broadly comprises, as a new class of compounds, the N-tricyanovinylamines and their preparation by the reaction of tetracyanoethylene with ammonium ion or the amines as defined above.

The examples illustrate the mild conditions under which the reaction of this invention takes place. To illustrate, Examples I, III, V, and XII all show the reaction proceeding smoothly at room temperature, or vigorously at room temperature as in Example XIII. No temperature higher than that produced by refluxing tetrahydrofuran (B. P. 65° C.) is normally required although any temperature up to the decomposition temperature of the reactants and product can be used.

The examples show the use of a solvent for carrying out the reaction of this invention, but the reaction may also be carried out in the absence of a solvent. Pressure is not critical and the reaction usually will be carried out at atmospheric pressure. Likewise, time is not critical except as it bears on the degree of completion of the reaction.

As mentioned previously, the compounds of the present invention can be represented by the formula:

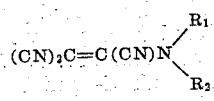

It should be noted that $R_1$ and $R_2$ not only can be hydrogen and such monovalent radicals as alkyl, cycloalkyl, aralkyl, and aryl but, when $R_1$ and $R_2$ are taken together, they can represent a divalent radical as in the case of N-tricyanovinylpiperidine. In such instances, the radical forms a cyclic structure with the nitrogen attached to one of the carbons doubly bonded to carbon in the characteristic grouping $(CN)_2C=C(CN)N$. Preferably, the divalent radicals are solely hydrocarbon and form with the nitrogen a heterocyclic structure.

The N-tricyanovinylamines, as a class, are potent sources of hydrogen cyanide and, because of this, highly useful as insecticides. When heated in the presence of moist alkali as in processes adapted for fumigation, the N-tricyanovinylamines generate hydrogen cyanide rapidly. When deposited from a faintly alkaline medium (pH 7:9) as by spraying of plants or insect nests, the N-tricyanovinylamines decompose slowly and give off hydrogen cyanide, thereby serving as effective insect poisons for extended periods of time.

The N-tricyanovinyl aromatic compounds of this invention, that is, the N-tricyanovinyl derivatives of aromatic amines, are characterized by their color, usually bright yellow, and their surprising effectiveness as dyes when applied from neutral and acidic media to textile materials. They are extremely valuable as dyes, particularly for textile materials made of synthetic fibers including "Orlon" acrylic fiber and "Dacron" polyester fiber.

The effectiveness of these aromatic compounds as dyes is shown by the following: A mixture of 40 parts sodium lauryl sulfate, 5 parts N-tricyanovinylaniline (product of Example V), and 1000 parts of water, was heated and stirred at 90–95° C. until a uniform dispersion was obtained. Skeins of cellulose acetate fibers were soaked and stirred in the above mixture for 10 minutes at the same temperature. The fibers were then washed with cold water and dried. This treatment imparted a bright yellow colour to the fibers. A sample skein of the above dyed fibers was exposed in a Fade-Ometer at 100° F. and 40—50% relative humidity. Half of the skein was covered to protect it from the exposure. After 40 hours of exposure the "break" between the exposed and unexposed portions of the skein was barely detectable, and there was no perceptible increase in the "break" after an additional 60 hours of exposure.

As many apparently widely different embodiments of this invention may be made without departing from the spirit and scope thereof, it is to be understood that the invention is not limited to the specific embodiments thereof except as defined in the appended claims.

The invention claimed is:

1. An N-tricyanovinylamine having the formula,

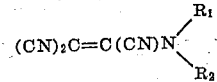

in which $R_1$ and $R_2$ are selected from the group consisting of hydrogen, alkyl, cycloalkyl, aralkyl, aryl, and, when $R_1$ and $R_2$ are taken together, piperidyl.

2. A process for preparing N-tricyanovinylamines of the formula defined in claim 1 which comprises reacting tetracyanoethylene with a member selected from the group consisting of ammonium ion; primary and secondary alkyl, cycloalkyl, aralkyl and aryl amines; and piperidine; and where, in the case of arylamines, tricyanovinyl substitution is directed to the amine group (1) by an annular carbon at the 2-position relative to a primary amine group on the ring being bonded to a member selected from the group consisting of hydrogen and halogen and (2) by a substituent other than hydrogen at the 4-position relative to a secondary amine group on the ring.

3. Process of preparing an N-tricyanovinylamine as set forth in claim 2 wherein said reaction is carried out in the presence of an organic liquid inert to the reactants and capable of dissolving tetracyanoethylene.

4. Process of preparing an N-tricyanovinylamine as set forth in claim 2 wherein said reaction is carried out in the presence of tetrahydrofuran and at a temperature between room temperature and the boiling point of said tetrahydrofuran.

5. N-tricyanovinyltoluidines.
6. N-tricyanovinyl-p-chloroaniline.
7. Methyl N-tricyanovinyl-p-aminobenzoate.
8. N-tricyanovinylnitroanilines.
9. N,N'-bistricyanovinyl-p-phenylenediamine.

References Cited in the file of this patent

UNITED STATES PATENTS

| | | |
|---|---|---|
| 1,992,615 | Hoffmann et al. | Feb. 20, 1935 |
| 2,264,354 | Alder et al. | Dec. 2, 1941 |
| 2,459,410 | Erickson | Jan. 18, 1949 |